(12) United States Patent
Schneck et al.

(10) Patent No.: US 12,502,257 B2
(45) Date of Patent: Dec. 23, 2025

(54) BIO-FUNCTIONALISED IMPLANT PART

(71) Applicant: Global D, Brignais (FR)

(72) Inventors: Eric Schneck, Lyons (FR); Romeo Casimiro, Saint Genis Laval (FR)

(73) Assignee: Global D, Brignais (FR)

( * ) Notice: Subject to any disclaimer, the term of this patent is extended or adjusted under 35 U.S.C. 154(b) by 575 days.

(21) Appl. No.: 17/618,599

(22) PCT Filed: Jun. 11, 2020

(86) PCT No.: PCT/EP2020/066245
§ 371 (c)(1),
(2) Date: Dec. 13, 2021

(87) PCT Pub. No.: WO2020/249702
PCT Pub. Date: Dec. 17, 2020

(65) Prior Publication Data
US 2022/0257351 A1    Aug. 18, 2022

(30) Foreign Application Priority Data
Jun. 13, 2019 (FR) ..................................... 1906331

(51) Int. Cl.
*A61C 8/00* (2006.01)
(52) U.S. Cl.
CPC ............ *A61C 8/0037* (2013.01); *A61C 8/005* (2013.01); *A61C 8/008* (2013.01); *A61C 2008/0046* (2013.01)
(58) Field of Classification Search
CPC ....... A61C 8/0037; A61C 8/005; A61C 8/008; A61C 2008/0046
See application file for complete search history.

(56) References Cited

U.S. PATENT DOCUMENTS 5,310,343 A  *  5/1994  Hasegawa ............ A61C 8/0012
                                                    433/173
5,591,029 A  *  1/1997  Zuest .................... A61C 8/0025
                                                    433/173
(Continued)

FOREIGN PATENT DOCUMENTS

CN         102525672 B    3/2015
WO          0158374 A2    8/2001
(Continued)

OTHER PUBLICATIONS

Aug. 14, 2020, International Search Report of Application No. PCT/EP2020/066245.

*Primary Examiner* — Eric J Rosen
*Assistant Examiner* — Hao D Mai
(74) *Attorney, Agent, or Firm* — Banner & Witcoff, Ltd.

(57) ABSTRACT

The present invention relates to a part (2) intended to be used in association with an implant (4) which is itself intended to be secured in a jaw, this part comprising, in series from its distal end (20) towards its proximal end (21), a distal portion (22) for securing in the implant, an intermediate portion (23) for attachment to the epithelial and/or connective tissue, and a proximal portion (24), this part also comprising at least two zones whose surfaces have a different structure, the structure of the surface of at least one of these two zones, located in said intermediate portion (23), said first zone being ordered and repetitive, adapted to the growth of the epithelial tissue and/or the connective tissue and having engravings forming corrugations with a depth of less than 0.5 microns.

13 Claims, 6 Drawing Sheets

(56) References Cited

U.S. PATENT DOCUMENTS

| | | | | |
|---|---|---|---|---|
| 5,873,725 A * | 2/1999 | Perler | A61C 5/35 | 433/221 |
| 5,947,735 A * | 9/1999 | Day | A61C 8/0022 | 433/173 |
| 5,989,027 A * | 11/1999 | Wagner | A61C 8/0006 | 433/173 |
| 6,095,817 A * | 8/2000 | Wagner | A61C 8/0012 | 433/173 |
| 6,174,167 B1 * | 1/2001 | Wohrle | A61C 8/0077 | 433/173 |
| 6,217,333 B1 * | 4/2001 | Ercoli | A61C 8/0018 | 433/201.1 |
| 6,364,663 B1 * | 4/2002 | Dinkelacker | A61C 8/0045 | 433/173 |
| 6,527,554 B2 * | 3/2003 | Hurson | A61C 8/0075 | 433/173 |
| 6,854,972 B1 * | 2/2005 | Elian | A61C 8/0006 | 433/173 |
| 7,210,933 B2 * | 5/2007 | Haessler | A61C 8/0089 | 433/174 |
| 7,556,500 B2 * | 7/2009 | Ihde | A61C 8/001 | 433/175 |
| 7,708,559 B2 * | 5/2010 | Wohrle | A61C 8/0066 | 433/174 |
| 7,780,447 B2 * | 8/2010 | Wohrle | A61C 8/0066 | 433/174 |
| 2002/0061494 A1 * | 5/2002 | Klardie | A61C 8/0012 | 433/174 |
| 2002/0168614 A1 * | 11/2002 | Riley | A61C 8/0048 | 433/223 |
| 2004/0152047 A1 * | 8/2004 | Odrich | A61C 8/005 | 433/173 |
| 2004/0265781 A1 * | 12/2004 | Coatoam | A61C 8/005 | 433/141 |
| 2005/0181330 A1 * | 8/2005 | Kim | A61C 8/005 | 433/173 |
| 2005/0227197 A1 * | 10/2005 | Lin | A61C 7/00 | 433/18 |
| 2006/0199152 A1 * | 9/2006 | Hurson | A61C 8/0012 | 433/173 |
| 2006/0263748 A1 * | 11/2006 | Schroering | A61C 8/0018 | 433/173 |
| 2007/0111164 A1 * | 5/2007 | Saade | A61C 8/0022 | 433/174 |
| 2008/0014556 A1 * | 1/2008 | Neumeyer | A61C 8/0075 | 433/174 |
| 2008/0213728 A1 * | 9/2008 | Rhew | A61C 8/0022 | 433/201.1 |
| 2010/0261141 A1 * | 10/2010 | Ajlouni | A61C 8/0066 | 433/174 |
| 2011/0117520 A1 * | 5/2011 | Kaigler, Sr. | A61C 8/0006 | 433/215 |
| 2016/0361143 A1 * | 12/2016 | Hochman | A61C 8/0068 | |
| 2018/0200028 A1 * | 7/2018 | Lomicka | A61C 8/006 | |

FOREIGN PATENT DOCUMENTS

| | | |
|---|---|---|
| WO | 03055406 A1 | 7/2003 |
| WO | 2011054119 A1 | 5/2011 |

* cited by examiner

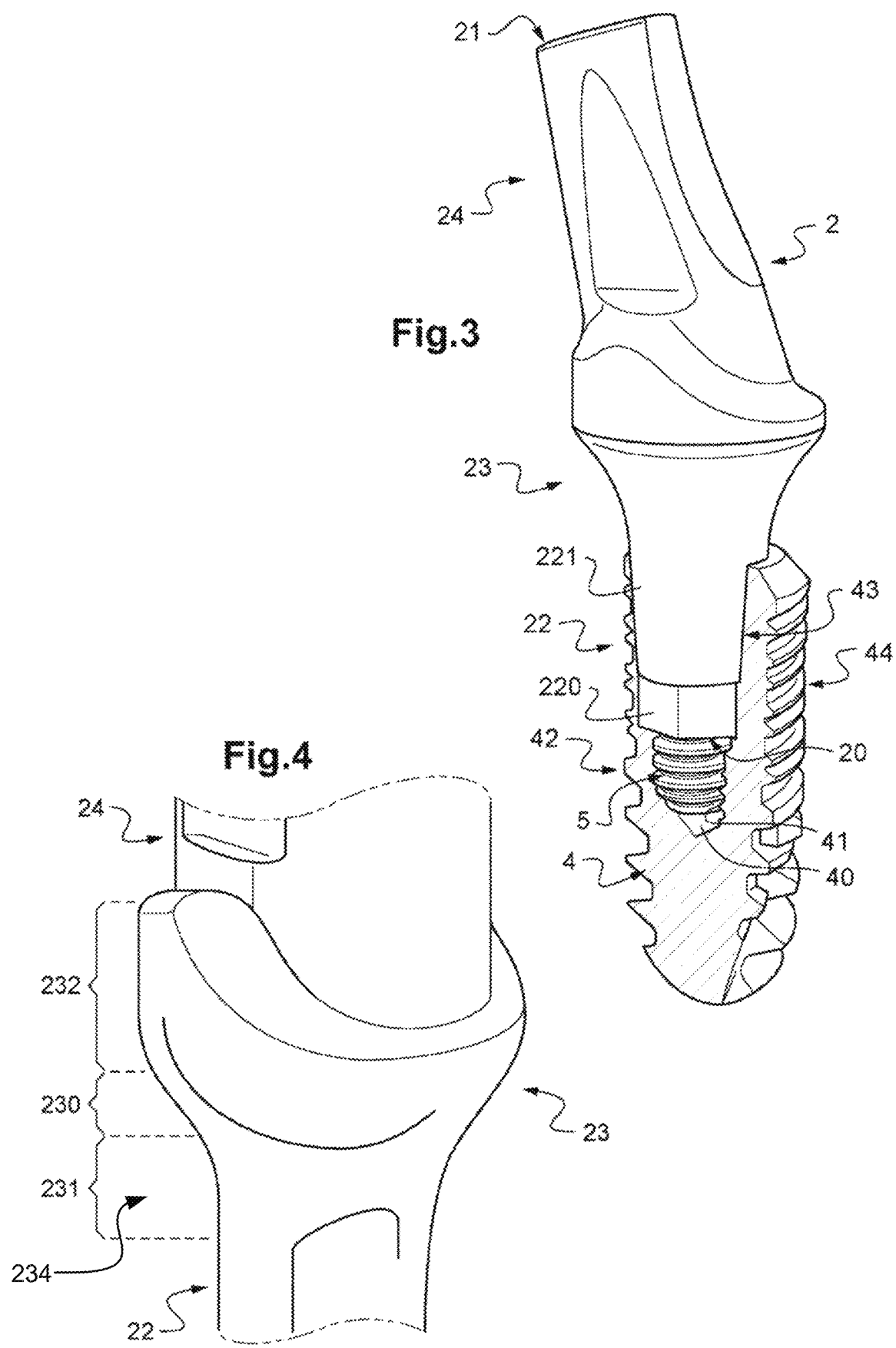

BIO-FUNCTIONALISED IMPLANT PART

The present invention relates to the technical field of implants and more particularly of components used in association with these implants, either temporarily or permanently.

It will be recalled that a dental implant comprises a threaded anchoring body which is fitted in place by screwing in a cavity of the jaw, the cavity being formed in particular by drilling. A healing screw is then fitted in place.

Later, after integration of the implant in the bone, the healing screw is removed and a prosthetic abutment is fixed in the implant. This abutment compensates for the thickness of the mucosa and permits fixation of the prosthetic element itself.

All the elements are made of a biocompatible material, for example of titanium or a titanium alloy.

It is also possible to use implants that are formed integrally with a prosthetic abutment, such as are described in the document FR 2 943 242, for example.

These implants have been perfected over the years in order to improve their integration in bone, in particular by engraving the surface of the anchoring body.

The invention starts out from the observation that good osseointegration of the implant in the months following its implantation does not avoid subsequent problems of loosening. This is due to degradation of the bone around the implant, in particular due to the presence of bacteria that introduce themselves between the implant and the epithelial and connective tissues.

The importance of the system of attachment of the mucous structures at the periphery of the tooth will be recalled with reference to FIG. 1.

This figure is a sectional view of the gum, making it possible to compare the situation of a natural tooth 10 (right-hand side of the figure) with that of an implant 11 anchored in the bone (left-hand side of the figure).

The implant 11 comprises a threaded anchoring body 110. A prosthetic abutment 111 is formed integrally with the anchoring body.

A prosthetic element 112 is moreover fixed on the abutment 111.

The tooth 10 comprises a root 100 and a crown 101.

The anchoring body 110 of the implant and the root 100 of the tooth are both inserted in the bone 12 of the jaw.

In the case of a natural tooth, the root is fixed to the bone by a layer of cement 13, which extends as far as the crown 101, and by the alveolodental ligament 14.

Of course, the layer of cement that covers the root of the tooth is not present on the implant. This is also the case for the alveolodental ligament.

The bone 12 is surrounded by a layer of connective tissue 15, which is itself covered with a layer of epithelium 16.

FIG. 1 shows first of all that the connective tissue comprises oriented fibers.

For a natural tooth, a distinction is made between two types of fibers: the fibers 170 which attach to the bone 12 and which are oriented at an angle of less than about 45° with respect to the axis X-X' of the tooth or of the implant, and the fibers 171 which extend substantially radially and which attach to the layer of cement present on the tooth, beyond the bone 12.

It will thus be understood that these radial fibers 171 are not present on the implant, since the latter does not comprise cement.

FIG. 1 confirms that, for an implant, it is only fibers 170 that are present, all of these fibers attaching to the surface of the bone 12.

It is known that, for a tooth, these fibers 171 oriented substantially perpendicular to the axis of the tooth make it possible to provide a tight protective barrier, in combination with the junctional epithelium 160, which is inserted at the interface between the root 100 and its crown 101.

For an implant, the junctional epithelium 161 is present, but its attachment to the abutment 111 of the implant is not very strong, all the more so in the absence of fibers oriented substantially perpendicular to the axis of the implant.

Thus, the healing around an implant leads to a connective tissue structure that is different than that observed with a natural tooth.

This also leads to drawbacks before fitting the implant abutment on the implant, that is to say in the presence of a healing screw. In fact, the same phenomenon occurs with the healing screw, since no fiber extending substantially radially is created at the level of this healing screw.

It is then possible to observe, during removal of this screw, a contraction of the elastic fibers, which leads to the reduction of the access opening to the connection with the implant, and which is therefore problematic when fitting the implant abutment in place.

The main object of the invention is to reduce the risks of an implant loosening over time, by preventing the introduction of bacteria.

All the known solutions relate to the implant and seek to differentiate the outer surface of the latter by providing zones of different structures.

By contrast, the invention starts out from the observation that the prosthetic abutments, like the healing screws, have hitherto been used only for their mechanical function, and that it is possible and desirable to confer other functions on them, without their design being modified in terms of general structure or dimensioning.

It is for this reason that the invention proposes promoting the re-creation, around the prosthetic abutment or healing screw, of an epithelial and/or connective tissue that is as similar as possible to the epithelial and/or connective tissue present around a natural tooth.

This makes it possible to recreate, around the abutment and/or healing screw, a barrier to the introduction of bacteria, which barrier will ensure the protection of the bone around the implant. The risks of loosening of the implant will therefore be considerably reduced.

The invention therefore relates to a component intended to be used in association with a dental implant which is itself intended to be fixed in a jaw, this component comprising successively, from its distal end and in the direction of its proximal end, a distal portion for fixing in the implant, an intermediate portion for attachment to epithelial and/or connective tissue, and a proximal portion, this component also comprising at least two zones whose surfaces have a different structure from each other, the structure of the surface of at least one of these two zones, situated in the intermediate portion, being ordered and repetitive, adapted to the growth of epithelial tissue and/or connective tissue, and having engravings which form ripples and of which the depth is less than 0.5 micron.

This component can be a prosthetic abutment, either integral with the implant or intended to be fixed in the latter, or a healing screw.

Preferably, said at least one zone, called the first zone, has a surface whose structure promotes the rate of growth of epithelial tissue and also the attachment of the latter to the component, this first zone being situated inside the intermediate portion.

The cells that develop on the surface of this first zone will direct their growth with a star-shaped cytoskeleton, specific to epithelial cells, which leads to the formation of the fibers of the epithelial tissue, which fibers attach to the surface of the abutment.

Thus, the component is able to create a first barrier to bacteria, which first barrier will be farthest from the bone in which the implant is anchored.

Moreover, it is also preferred that, in addition to this first zone, the component comprises a second zone whose surface has a structure different than that of the first zone and which, in turn, will promote the growth of the connective tissue and the attachment of the latter to the component, this second zone also being situated in the intermediate portion of the component, between the distal portion and the first zone of the intermediate portion.

The cells that develop on the surface of this second zone will direct their growth with an elongate cytoskeleton, specific to the fibroblast cells at the origin of the connective tissue, comprising fibers that are oriented substantially radially or perpendicularly with respect to this surface.

These substantially radial fibers formed in the connective tissue thus form a reinforcement zone for the epithelial attachment, as has been observed for a natural tooth.

It is also possible to provide, inside this second zone, at least one other zone spaced apart from the first zone but having a surface whose structure has a function similar to that of the first zone. This other zone therefore has a structure different than that of the second zone.

This other zone makes it possible to create, inside a region of the connective tissue facing this second zone, an attachment point of the epithelial type, between the actual epithelial attachment itself and the bone.

The structure of said first zone and of said possible other zone can in particular comprise micro-columns covered by said engravings which form ripples.

Thus, the invention makes it possible to direct and control the attachments of the epithelial and connective tissues to this component, whether it is an implant abutment or a healing screw. This makes it possible to create a biological seal around the implant, similar to the one that exists for a natural tooth, which protects the bone.

In other advantageous embodiments, one or other of the following provisions is also used:
  the component comprises, in its intermediate portion, a third zone whose surface has a structure different than that of the first zone, this surface being textured in order to limit the attachment of dental plaque, this third zone being situated between said first zone and the proximal portion.
  The surface of the third zone is hydrophobic.
  the structure of said third zone can comprise nanopillars.
  For a component in the form of an abutment intended to be fixed in an implant, this abutment comprises, in its distal portion, a textured surface for ensuring the mechanical retention or sealing between the abutment and the implant.
  When the component is a prosthetic abutment, its proximal portion comprises a zone for fixing a prosthetic element, extending from the proximal end of the abutment, this zone having a surface whose structure is textured in order to improve the fixation between the abutment and the prosthetic element.

Thus, with the invention, the components in the form of a prosthetic abutment or healing screw are no longer passive components but can have an active role both in tissue differentiation and proliferation and also in the prevention of dental plaque, and, in the more specific case of the prosthetic abutments, for their fixation in an implant and to a prosthetic element.

Finally, the distal end of the component preferably has an engraved surface in order to ensure its traceability.

The invention will be better understood and other aims, advantages and features thereof will emerge more clearly on reading the description which is given with reference to the appended drawings, in which:

FIG. 3 is a perspective and partially sectional view showing the abutment from FIG. 2 placed on an implant that is intended to be fixed in the gum.

FIG. 4 is an enlarged view of a detail from FIG. 2.

The features common to the various figures will be assigned the same references.

Figure 1:
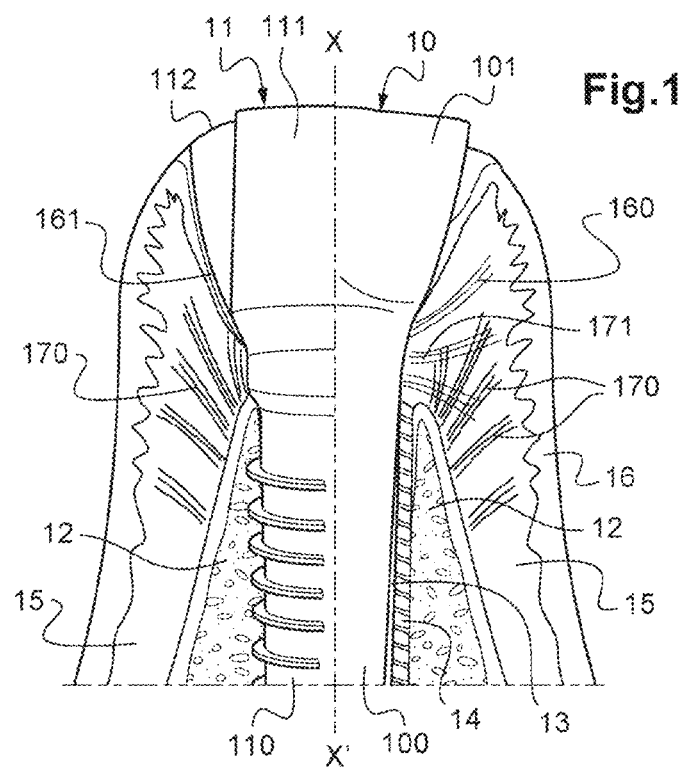
FIG. 1 (already described) is a sectional view of the gum with a natural tooth and an implant anchored in the bone.
Figure 2:
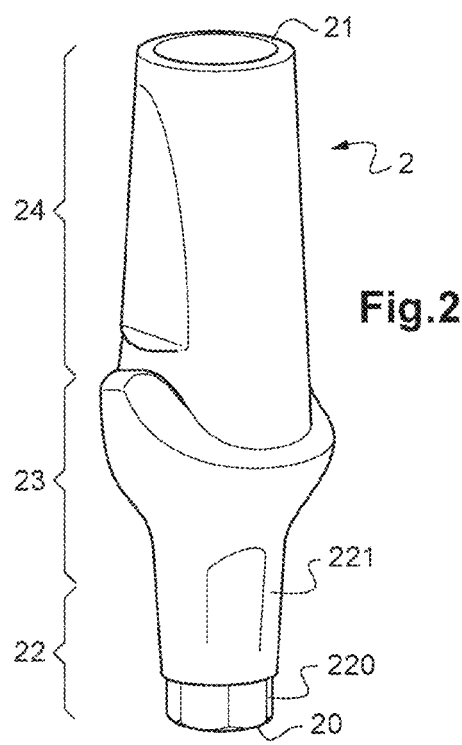
FIG. 2 is a perspective view of an example of a prosthetic abutment according to the invention.

Reference is made first of all to FIG. 2, which illustrates an example of a prosthetic abutment according to the invention.

This abutment 2 comprises successively, from its distal end 20 and in the direction of its proximal end 21, a distal portion 22 for fixing in an implant, an intermediate portion 23, and a proximal portion 24.

The height of the distal portion 22 can be approximately 3 mm, that of the intermediate or sulcular portion 23 can be between 0.7 and 7 mm, and that of the proximal portion 24 can be between 4 and 12 mm.

This proximal portion 24 serves for fixing a prosthetic element on the abutment, while the intermediate portion 23 allows in particular the attachment of the abutment to the epithelial and connective tissues.

FIG. 3 illustrates an abutment 2 of the type in FIG. 2, when placed in an implant 4, which is shown here in section.

The implant 4 is provided with a first blind internal bore 40 comprising, on a distal end portion 42, an internal thread 41, and a frustoconical proximal end portion 43 for joining to the abutment 2.

The implant has a thread 44 on its outer face.

The distal portion 22 of the abutment comprises, starting from the distal end 20, a first part 220 and a second part 221.

In a known manner, the second part 221 is frustoconical and is designed to cooperate by friction with the proximal end portion 43 of the implant when the junction between the abutment and the implant is complete.

Furthermore, the first part 220 comprises bevels and is designed to cooperate with a zone of corresponding shape of the implant 4, situated between the internal thread 41 and the frustoconical end portion 43.

Finally, the abutment 2 is fixed in the implant by means of a screw 5 which penetrates into a bore of the abutment in order to be screwed into the internal thread 41 of the implant, by virtue of the thread present on a distal portion of the screw.

In the context of the invention, the structure of the surface of the intermediate portion 23 is defined so as to promote the attachment of the abutment to the epithelial and connective tissues.

Reference is now made to FIG. 4, which illustrates in more detail the intermediate portion 23 of the abutment 2.

In practice, this intermediate portion can be broken down into three zones:

- a first zone 230, the surface of which has a structure intended to promote the growth of epithelial tissue and the attachment of the latter to the abutment 2, this first zone 230 being flanked by
- a second zone 231 which extends between the first zone and the distal portion 22 of the abutment, this second zone having a surface whose structure promotes the growth of connective tissue, with fibers oriented substantially radially, and also the attachment of said tissue to the abutment 2, and by
- a third zone 232 which extends between this first zone and the proximal portion 24 of the abutment, the surface of this third zone being hydrophobic, so as to limit the attachment of dental plaque.

It should be noted here that this intermediate portion 23 does not necessarily comprise three zones whose surface has a structure with a particular function, as stated above.

In practice, however, there should be at least a first zone whose surface has a structure promoting the growth of epithelial tissue or a second zone whose surface has a structure promoting the growth of connective tissue with fibers oriented substantially radially.

If only one of these zones were to be present on the abutment, it is the first zone that would preferably be provided, since it permits the creation of a biological seal around the abutment and therefore makes it possible to create a first barrier to bacteria as close as possible to their point of entry into the gum.

This first barrier results in particular from the fact that the epithelial cells attach themselves to the abutment.

Of course, even greater efficacy is obtained when the first and second zones are present on the abutment. Indeed, the presence of the second zone makes it possible to obtain a connective tissue whose structure is similar to that which exists with a natural tooth, and which then constitutes an effective support structure for epithelial attachment.

In this second zone, the fibers of the connective tissue do not wind around the abutment but extend substantially perpendicularly or radially with respect to the abutment.

The abutment according to the invention thus makes it possible to re-establish a cellular environment very similar to the one existing around a natural tooth.

Finally, the third zone 232, when present, contributes further to the efficacy of the biological seal thus created, by limiting the attachment of dental plaque.

With reference to FIGS. 7 to 10, examples of surface structures will now be explained which make it possible to fulfill the functions that have just been described.

Generally, these structures are obtained by means of a femtosecond laser, that is to say a laser producing ultrashort pulses whose duration is between a few femtoseconds and a few hundred femtoseconds.

They then undergo a cleaning operation.

A laser of this type makes it possible to obtain engravings whose depth is of the order of a hundredth of a micron and which are ordered, that is to say non-random, and repetitive, that is to say are formed of a pattern repeated on this surface and are reproducible. It is thus possible, with certainty, to confer the desired function on each surface, by suitably parameterizing the laser.

Moreover, the laser treatment of the abutment surface, carried out with air, oxidizes this surface. This is in particular due to the temperature level reached at the surface during this treatment.

Thus, when the abutment is made of titanium or of a titanium alloy, the laser treatment creates a layer of titanium oxide which is a biocompatible surface and is more resistant to corrosion than the starting constituent material. Moreover, this oxide layer promotes mineralization.

Examples of structures for the surfaces of each of the three zones 230 to 232 will now be described.

At the level of the first zone 230, provision may be made to texturize the abutment by a femtosecond laser so as to obtain micro-columns that are covered with periodic surface structures forming ripples (or LIPSS, that is to say Laser-Induced Periodic Surface Structures). This particular structure is designated by the term MC-LIPSS.

Figure 5:
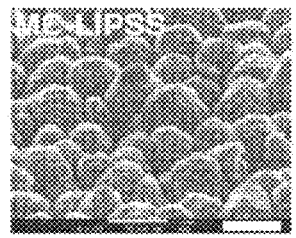
FIG. 5 is a photograph of a structure of the MC-LIPSS type.

An example of an MC-LIPSS surface structure is illustrated in FIG. 5. Thus, this surface comprises micro-columns whose cross section is substantially elliptical and which are covered with structures forming ripples (LIPSS structures) whose periodicity is of the same order of magnitude as the radiation wavelength of the laser or of a few hundred nanometers. Thus, two adjacent ripples are spaced apart from each other by a distance of between 500 nm and 1000 nm.

Figure 6:
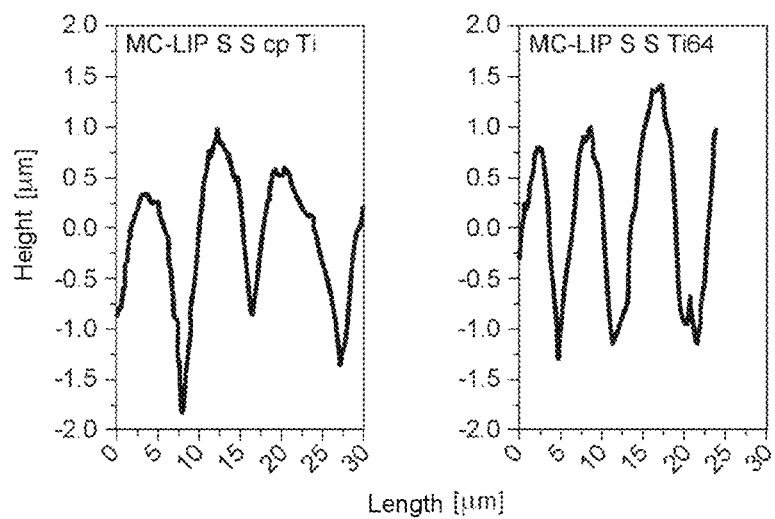
FIG. 6 shows two diagrams illustrating the roughness profiles corresponding to an MC-LIPSS structure.

FIG. 6 shows for two types of titanium, a commercially pure titanium (cp Ti) and a titanium alloy (of the type Ti6Al4V), two graphs illustrating the variation in the height of the roughnesses of the textured surface (in microns), according to a standardized measurement of the linear surface profile, as a function of the length of the sample (in microns).

The roughness parameters of such a surface were measured. It will be noted that the parameter $R_a$ gives the arithmetic mean roughness of the profile, while the parameter $R_z$ gives the maximum roughness of the profile.

The parameter $R_a$ (expressed in microns) is of the order of 0.8 micron for a titanium substrate and of the order of 0.7 micron for a Ti6Al4V substrate.

Furthermore, the parameter $R_z$ (expressed in microns) is of the order of 5.3 for a titanium substrate and of the order of 5.4 for a Ti6Al4V support.

In practice, a texturing with micro-columns is obtained by treating the surface using a femtosecond laser. Under the effect of the femtosecond laser, firstly, the periodic surface structures appear in the form of substantially parallel ripples (LIPSS) and, by virtue of the pulse energy of the femtosecond laser, the micro-columns appear in a second step. They are thus covered with LIPSS structures.

Preferably, the diameter of each micro-column at its base is between 600 nm and 800 nm.

This structure can extend uniformly over the entire surface of the first zone.

However, the invention is not limited to this embodiment.

Thus, on the surface of the first zone, a specific design can be produced, consisting of geometric figures distributed in the form of a matrix, these figures possibly being a circle, a square or a triangle, for example. In this matrix, two adjacent figures are typically spaced apart by a distance of between 25 microns and 75 microns. These figures define the space in which the micro-columns are located.

In practice, these non-random geometric figures are obtained by concentrating the pulse energy of the femtosecond laser in specific zones that define these geometric shapes.

The micro-columns covered with LIPSS structures are obtained in these zones, while the rest of the surface is only covered with LIPSS structures.

The entire surface is therefore covered with structures forming ripples of the LIPSS type.

Thus, these ripples cover the entire surface of the first zone, whether or not the latter comprises micro-columns over its entire surface.

Preferably, two adjacent ripples are spaced apart from each other by a distance of between 500 nm and 1000 nm and have a height of between 100 nm and 500 nm.

In a variant, provision can be made to adjust the femtosecond laser in order to concentrate its pulse energy and thus locally vaporize the surface of the first zone. The MC-LIPSS structure is generated around this vaporization, over the entire surface.

When the MC-LIPSS structure is produced according to a matrix, the surface of the first zone, which is neither vaporized nor covered with an MC-LIPSS structure, is covered with LIPSS structures.

This type of structure has been found to promote the differentiation and growth of epithelial tissue, which is why it is provided in the first zone 230 of the intermediate portion 23.

As regards now the second zone 231, provision can be made to texturize its surface so that it has structure of the LIPSS type (Laser-Induced Periodic Surface Structures), that is to say a periodic surface structure obtained by laser treatment.

As has been indicated above, these structures consist of substantially parallel ripples.

Figure 7:
FIG. 7 is a photograph of a structure of the LIPSS type.

A structure of this type is shown in FIG. 7.

Figure 8:
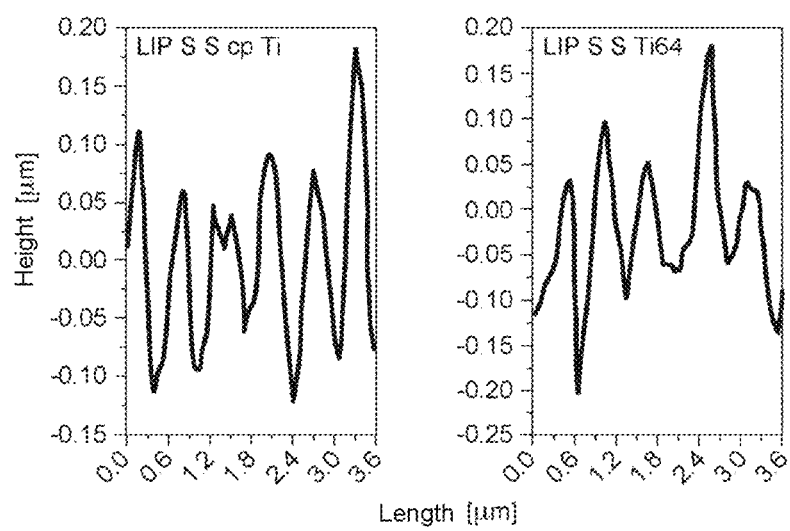
FIG. 8 shows two diagrams illustrating the roughness profiles corresponding to a structure of the LIPSS type.

FIG. 8 is a view similar to FIG. 6 and shows two graphs, the first corresponding to pure titanium and the second to a titanium alloy of the Ti6Al4V type, illustrating the variation in the height of the roughnesses of the surface (in microns) according to a standardized measurement of the linear surface profile, as a function of the length (in microns) of the sample.

As before, the roughness parameters $R_a$ and $R_z$ can be calculated for this type of structure. It is thus possible to measure that $R_a$ is substantially equal to 0.3 micron for pure titanium and for an alloy of the Ti6Al4V type, and that $R_z$ is equal to approximately 1.5 microns for pure titanium and 1.4 microns for an alloy of the Ti6Al4V type.

In the context of the invention, a structure of the LIPSS type will be used whose ripples are spaced apart by approximately 500 nm and, more generally, whose periodicity is between 500 nm and 1000 nm, these ripples having a height of between 100 nm and 500 nm.

It has been found that a structure of this type makes it possible to promote the growth of connective tissue with fibers oriented substantially radially.

As has been explained above, this second zone 231 is preferably provided in addition to the first zone 230, so as to constitute an effective support for the epithelial attachment, the formation of which is promoted by the particular texturing of the first zone 230. However, this second zone 231 could be provided on its own.

In this regard, it may be advantageous to provide, inside this second zone 231, a surface part 234 which has a different texturing and promotes the formation of epithelial tissue.

Thus, this surface part 234 will be able to have, for example in an annular fashion, a texturing identical to that of the first zone 230 or, in any event, a texturing that fulfills the same function.

The presence of this other differentiated zone 234 inside the second zone makes it possible to create, inside the latter, a point of attachment of the epithelial tissue, under the epithelial attachment itself, which creates an additional barrier against the introduction of bacteria.

It should be emphasized that the surface structures described with reference to FIGS. 7 to 10 are only examples of implementation of the invention and that the latter is not limited to these examples.

As regards now the third zone 232 of the intermediate portion 23, it will be possible to provide on its surface a texturing of the nanopillar type (NP).

Figure 9:
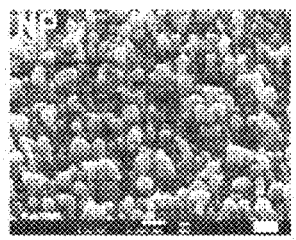
FIG. 9 is a photograph of an NP type structure.

This structure is illustrated in FIG. 9.

Figure 10:
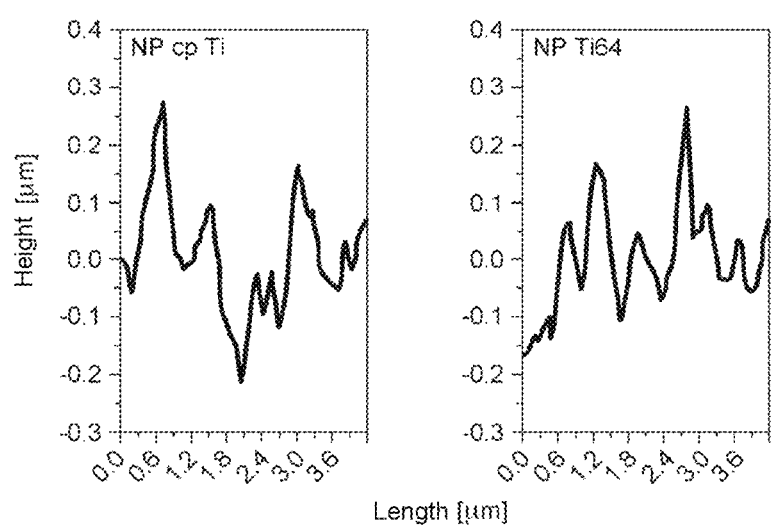
FIG. 10 shows two diagrams illustrating the roughness profiles corresponding to an NP structure.

Furthermore, FIG. 10, like FIGS. 6 and 8 described above, shows two graphs illustrating the roughness profiles of such texturing, on the one hand for pure titanium and on the other hand for a titanium alloy of the Ti6Al4V type.

Each of these graphs gives the height of the roughnesses (in microns) according to a standardized measurement of the linear surface profile, as a function of the length of the sample (in microns).

The roughness parameters $R_a$ and $R_z$ were also calculated for this type of texturing. Thus, $R_a$ is substantially equal to 0.3 micron for pure titanium and an alloy of the Ti6Al4V type, while $R_z$ is equal to approximately 1.6 microns for a pure titanium substrate and 1.3 microns for a substrate made of titanium alloy of the Ti6Al4V type.

A nanopillar structure of this type is obtained by means of a femtosecond laser and in two steps.

In a first step, the surface of the substrate is treated to obtain periodic surface structures (of the LIPSS type) which are in the form of substantially parallel ripples.

In this first step, the parameters of the laser are set so that they generate 192 pulses, with a fluence of 0.3 J/cm$^2$. In this first step, the polarization of the laser beam is straight.

The second step of the surface treatment is again carried out by a femtosecond laser, but with a lower fluence and smaller number of pulses. Thus, this second step can be carried out with a laser configured to generate 47 pulses, with a fluence of 0.10 J/cm$^2$. In this second step, the polarization of the laser beam is still straight, but its direction is rotated through 90° with respect to the direction of the polarization used in the first step of the surface treatment.

Thus, the ripples formed during the first step of the treatment are partially destroyed by the second step of the treatment, so as to form these nanopillars.

This structure can extend uniformly over the entire surface of the second zone.

However, the invention is not limited to this embodiment. Thus, the surface of the second zone can comprise a matrix of pads of substantially square shape, the nanopillar structure being produced on the surface of each pad.

In this matrix, the side of the pads is between 20 microns and 45 microns, and two adjacent pads are spaced apart by a distance of between 20 microns and 35 microns.

It will be noted that this surface structure makes it possible to limit the formation of biofilm with respect in particular to a polished surface.

That is why this type of texturing is advantageously used in the third zone 232.

However, the invention is not limited to this type of texturing.

In particular, it has been observed that a textured surface of the LIPSS type also has this particular feature of avoiding the formation of biofilm.

Finally, and in a non-limiting manner, any type of hydrophobic surface can be used for this third zone 232, in order to avoid the formation of biofilm.

It will thus be understood that this third zone makes it possible to reinforce the effects of the first zone and/or of the second zone by limiting the presence of bacteria above these two zones. It therefore reinforces the biological barrier function already fulfilled by one or the other of these two zones.

In addition to the particular structures that are given to the surface of the abutment in its intermediate portion, the invention also proposes that the other surfaces of the abutment be provided with particular structures in order to give them enhanced functions.

Reference is again made to FIG. 2, which illustrates not only the intermediate portion 23 but also the distal portion and the proximal portion of the abutment.

As has been indicated above, the distal portion 22 is the portion of the abutment that will serve for fixing it in the implant.

Preferably, the structure of the surface of this distal portion 22 is chosen so as to improve the sealing of the connection between the abutment 2 and the implant.

This structure can also be obtained by the action of a femtosecond laser. It may in particular be a structure having a micrometric grip aimed at increasing the mechanical bond retention (for example conical) between the abutment and the implant and at improving the sealing at the interface between the two components.

Improving the sealing of the connection between the abutment and the implant also makes it possible to avoid contamination by pathogenic bacteria present in the mouth, which can lead to bone loss.

In this distal part, and in particular in the most distal first part 220, an engraving of the abutment can be provided, here once again by means of a nanosecond or femtosecond laser.

This engraving can consist of a 2D code, of the data Matrix type, permitting the unique identification of the abutment.

By virtue of this engraving, it is then possible to trace the abutment in an original and unique manner, after it has been fixed in the implant.

Furthermore, the proximal portion 24 of the abutment is intended for fixing a prosthesis.

Here again, provision can be made for the surface of this proximal portion to have a particular structure, in order to improve the attachment of the prosthesis to the abutment.

By way of example, this structure can be of greater roughness than the raw machined structure, in order to increase the retention of the sealing or bonding of the prosthesis on the abutment.

It will thus be understood that the invention proposes giving the surface of each part of the abutment a specific structure, so as to confer on it a particular function or to improve the function already fulfilled.

These different parts of the abutment are therefore no longer passive but on the contrary active in relation to their environment, whether or not a living environment.

Figure 11:
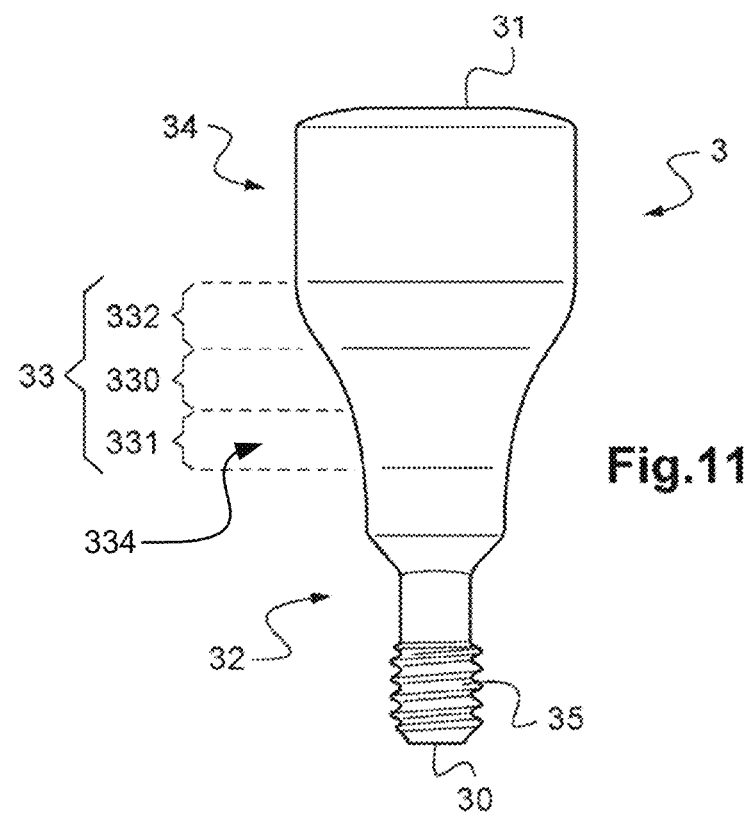
FIG. 11 is a perspective view of an example of a healing screw according to the invention.
Figure 12:
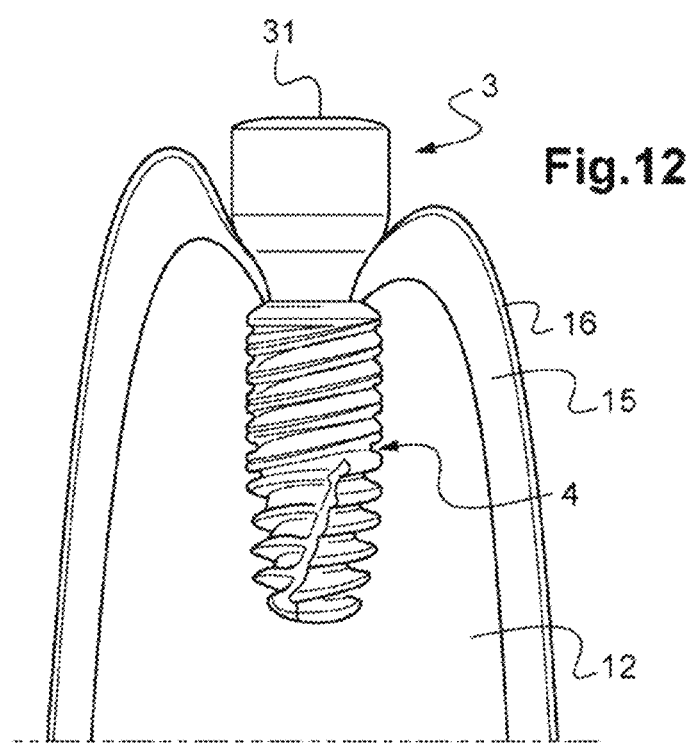
FIG. 12 is a view of the screw shown in FIG. 11 when placed in an implant fixed in the gum.

Reference will now be made to FIGS. 11 and 12 which illustrate a healing screw, in order to show how the invention can be adapted to such a screw.

On such a healing screw 3, three portions can also be defined from its distal end 30 to its proximal end 31. Thus, the screw 3 comprises a distal portion 32 for fixing in the implant 4, this portion comprising a thread 35.

This distal portion 32 comprises, for example, a conical zone, the height of which is approximately 2 mm, and a thread, the height of which is between 1 and 3 mm, for a diameter of between 1.2 and 2 mm.

In the direction of its proximal end, there extends an intermediate portion 33, the height of which is between 0.7 and 7 mm and which is in particular equal to 3 mm. It is continued by a proximal portion 34, the height of which is between 1 and 5 mm and which is in particular equal to 3 mm. The latter corresponds to the part of the screw situated partially outside the gum when the healing screw is screwed into the implant, the latter itself being fixed in the jaw of a patient.

Within the intermediate portion 33, three zones can be defined: a first zone 330, framed by a second zone 331 and a third zone 332. The second zone 331 extends between the first zone 330 and the distal portion 32 of the screw, while the third zone extends between the first zone and the proximal portion 34 of the screw.

As with an abutment according to the invention, the surface of each of these zones is chosen to have a particular function.

Thus, the structure of the surface of the first zone 330 will be chosen to promote the growth of epithelial tissue. As has been described above, this structure can in particular be of the MC-LIPSS type. This structure has already been described for an abutment and will not be described again in detail.

Likewise, the structure of the surface of the second zone 331 will be chosen so as to promote the growth of connective tissue, with fibers oriented substantially radially.

This structure can in particular be of the LIPSS type, as has been described above for an abutment.

Finally, the structure of the surface of the third zone 332 will be chosen such that this surface is hydrophobic, and reference will again be made here to the examples given above for an abutment according to the invention.

It is preferably the first zone 330 that has a functionalized surface, so as to create a barrier to bacteria that is farthest from the bone.

This barrier function is of course reinforced when the second zone 331 is itself functionalized in accordance with the invention.

Finally, the third zone 332, when it is hydrophobic, makes it possible to avoid the attachment of dental plaque, and this further reinforces the barrier function provided by the first zone 330 and/or the second zone 331. The function of this third zone 332 is therefore complementary to that of the first zone and/or of the second zone.

As has been described for the abutment 2, annular parts 334 can be provided inside the second zone 331, the surface of said annular parts 334 having a structure that has the same function as the first zone, that is to say promoting the growth of epithelial tissue. This makes it possible to create, inside the second zone, epithelial attachments in addition to the one already created at the level of the first zone 330.

FIG. 12 shows the screw 3 in the implant 4, which is itself fixed in the bone 12.

Finally, the invention is not limited to the examples that have just been described, and other variants could be envisioned.

Thus, the constituent materials of an abutment or of a healing screw according to the invention are typically based on titanium, whether commercially pure titanium or a titanium alloy. However, other biocompatible materials can be considered, such as other metal alloys (titanium-niobium, titanium-zirconium, cobalt-chromium), ceramics (zirconia) or plastics (PEEK, polyethylene).

The invention claimed is:

1. A component (2, 3), configured for use in association with a dental implant (4) which is itself configured to be fixed in a jaw, the dental implant having an internal bore, said component comprising:
   a distal portion (22, 32) configured for fixing into the implant, said distal portion being sized and shaped for insertion in the internal bore of the implant;
   an intermediate portion (23, 33) configured for attachment to epithelial and/or connective tissues of the jaw; and
   a proximal portion (24, 34),
   wherein the intermediate portion is located between the proximal portion and the distal portion,
   wherein the component comprises at least two zones that have different surface structures,
   wherein the at least two zones comprise a first zone situated in the intermediate portion (23, 33), and
   wherein a first surface structure of the first zone:
      is ordered and repetitive,
      is adapted to promote the growth of the epithelial tissue and attachment of the epithelial tissue to the component, and
      comprises engravings which form ripples, having a depth less than 0.5 micron and micro-columns covered by the engravings which form the ripples.

2. The component as claimed in claim 1, wherein the at least two zones comprise a second zone (231, 331), wherein a second surface structure of the second zone is different than the first surface structure of the first zone (230, 330) and is configured to promote the growth of the connective tissue and attachment of the connective tissue to the component, and wherein the second zone is situated, in the intermediate portion of the component, between the distal portion (22, 32) and the first zone (230, 330).

3. The component as claimed in claim 2, wherein the at least two zones comprise at least one third zone, inside the second zone (231, 331), that is spaced apart from the first zone, and wherein a third surface structure of the at least one third zone is ordered and repetitive, is different from the second surface structure of the second zone, and is configured to promote a rate of growth of the epithelial tissue and attachment of the epithelial tissue to the component.

4. The component as claimed in claim 3, wherein the third surface structure of the at least one third zone comprises micro-columns covered by engravings that form the ripples.

5. The component as claimed in claim 1, further comprising:
   in the intermediate portion, a third zone (232, 332), comprising a third surface structure, different from the first surface structure of the first zone, configured to limit attachment of dental plaque, wherein the third zone is situated between the first zone (230, 330) and the proximal portion (24, 34).

6. The component as claimed in claim 5, wherein the third surface structure of the third zone is hydrophobic.

7. The component as claimed in claim 5, wherein the third surface structure of the third zone (232, 332) comprises nanopillars.

8. The component as claimed in claim 1, wherein the component is in the form of a prosthetic abutment (2) configured to be fixed in the implant, the abutment comprising, in the distal portion (22), a textured surface configured to ensure mechanical retention or sealing between the abutment and the implant.

9. The component as claimed in claim 1, wherein the component is a prosthetic abutment (2), and wherein the proximal portion (24) comprises a zone that:
   is configured for fixing a prosthetic element to extend from a proximal end (21) of the abutment, and
   comprises a textured surface configured to improve fixation between the abutment and the prosthetic element.

10. The component as claimed in claim 1, wherein the component is a healing screw (3), the distal portion having fixing means integral with the healing screw and designed to cooperate with a zone of corresponding shape in the internal bore of the implant.

11. The component as claimed in claim 1, wherein the distal portion (22, 32) comprises a zone having a surface that is engraved in order to ensure traceability.

12. A prosthetic abutment (2), configured for use in association with a dental implant (4) which is itself configured to be fixed in a jaw, the dental implant having an internal bore, said abutment comprising:
   a distal portion (22, 32) configured for fixing into the implant, said distal portion being sized and shaped for insertion into the internal bore of the implant;
   an intermediate portion (23, 33) configured for attachment to epithelial and/or connective tissues of the jaw; and
   a proximal portion (24, 34) configured for fixing a prosthetic element to extend from a proximal end (21) of the abutment,
   wherein the intermediate portion is located between the proximal portion and the distal portion,
   wherein the abutment comprises at least two zones that have different surface structures,
   wherein the at least two zones comprise a first zone situated in the intermediate portion (23, 33), and
   wherein a first surface structure of the first zone:
      is ordered and repetitive,
      is adapted to promote the growth of the epithelial tissue and attachment of the epithelial tissue to the abutment, and
      comprises micro-columns covered by engravings which form ripples.

13. A healing screw (3), configured for use in association with a dental implant (4) which is itself configured to be fixed in a jaw, the dental implant having an internal bore, said healing screw comprising:
   a distal portion (22, 32) configured for fixing into the implant, said distal portion being sized and shaped for insertion into the internal bore of the implant and having fixing means integral with the screw which are designed for cooperation with a zone of corresponding shape in the internal bore of the implant;
   an intermediate portion (23, 33) configured for attachment to epithelial and/or connective tissues of the jaw; and
   a proximal portion (24, 34),
   wherein the intermediate portion is located between the proximal portion and the distal portion,
   wherein the healing screw comprises at least two zones that have different surface structures, wherein the at least two zones comprise a first zone situated in the intermediate portion (23, 33), and wherein a first surface structure of the first zone:
   is ordered and repetitive,
   is adapted to promote the growth of the epithelial tissue and attachment of the epithelial tissue to the healing screw, and
   comprises micro-columns covered by engravings which form ripples.

\* \* \* \* \*